United States Patent
Takiguchi

(10) Patent No.: US 6,568,550 B2
(45) Date of Patent: May 27, 2003

(54) PLASTIC CONTAINER AND METHOD FOR PRODUCING THE SAME

(75) Inventor: Kazuyuki Takiguchi, Kanagawa (JP)

(73) Assignee: Unisia Jecs Corporation, Atsugi (JP)

(*) Notice: Subject to any disclaimer, the term of this patent is extended or adjusted under 35 U.S.C. 154(b) by 22 days.

(21) Appl. No.: 09/927,353

(22) Filed: Aug. 13, 2001

(65) Prior Publication Data

US 2002/0020703 A1 Feb. 21, 2002

(30) Foreign Application Priority Data

Aug. 15, 2000 (JP) ........................................ 2000-246144

(51) Int. Cl.⁷ .............................. B65D 7/02; B65D 7/42
(52) U.S. Cl. ...................... 220/4.01; 220/504; 220/613; 220/648
(58) Field of Search ............................... 220/4.01, 4.21, 220/4.26, 4.27, 505, 648, 649, 612, 613, 504

(56) References Cited

U.S. PATENT DOCUMENTS 1,748,138 A * 2/1930 McBride
3,370,737 A * 2/1968 Ainslie
3,450,082 A * 6/1969 Demares, Jr.
4,219,125 A * 8/1980 Wiltshire et al.
5,017,044 A * 5/1991 Sharp

FOREIGN PATENT DOCUMENTS

| JP | 2-113570 | 9/1990 |
| JP | 8-121138 | 5/1996 |
| JP | 11-198173 | 7/1999 |

* cited by examiner

Primary Examiner—Joseph M. Moy
(74) Attorney, Agent, or Firm—Foley & Lardner

(57) ABSTRACT

A plastic container is constituted by upper and lower tank members and a filter. The filter has a cylinder portion, upper and lower flanges fixed to both ends of the cylinder portion respectively. The upper flange of the filter has a cylindrical flange portion engaged with inner surfaces of butt portions of the upper and lower tank members. Further, a clamped portion is formed on an outer periphery of the cylindrical flange portion and is clamped by the butt portions. The upper and lower tank members are fixedly connected by a plastic band which is formed by executing an injection welding on an outer peripheral portion including the butt portions and the clamped portion.

5 Claims, 8 Drawing Sheets

US 6,568,550 B2

PLASTIC CONTAINER AND METHOD FOR PRODUCING THE SAME

BACKGROUND OF THE INVENTION

The present invention relates to a plastic container, and more particularly to a vehicle oil tank which is made of plastic and provided with a filter.

In recent years, there is a demand for employing a plastic container as a vehicle oil tank in view of lightening a weight and decreasing a production cost. In order to satisfy this demand, various plastic containers have been developed.

Japanese Patent Provisional Publication No. (Heisei) 8-121138 discloses a plastic container employed as an oil strainer. This plastic container is produced by butting first and second container members and by executing injection welding onto an outer peripheral area of the butted surfaces so that a plastic belt is formed on and fixedly connected to the outer peripheral area by this injection welding.

SUMMARY OF THE INVENTION

However, such a conventional plastic container tends to generate strain during the welding since high-pressure melting plastic is injected on the outer periphery of the container.

It is an object of the present invention to provide a plastic container which has a structure that ensures a high-accuracy in dimension and prevents strain from being generated by injection welding, and to further provide a method of producing this improved plastic container.

A first aspect of the present invention resides in a plastic container which comprises a first container member comprising a first butt portion, a second container member comprising a second butt portion butted with the first butt portion, an inner member comprising a cylindrical portion and a band member formed on the first and second butt portions by injection welding, the inner member being disposed in a space defined by the first and second container members, the cylindrical portion of the inner member being engaged with the first and second butt portions, and the band member fixedly connecting the first and second butt portions.

Another aspect of the present invention resides in a method for producing a plastic container enclosing a filter. The method comprises a step of molding first and second tank members, respectively, a step of molding an inner member having a cylindrical flange portion and an annular clamped portion, a step of assembling the first and second tank members and the inner member so that the cylindrical flange portion of the inner member is engaged with the inner surfaces of the first and second tank members and that the annular clamped portion of the inner member is clamped by butt portions of the first and second tank members, and a step of welding an outer peripheral portion of the butt portions and the annular clamped portion to form a plastic annular band on the outer peripheral portion.

DETAILED DESCRIPTION OF THE INVENTION

Referring to FIGS. 1 to 8, there is shown an embodiment of a plastic container according to the present invention.

Figure 1:
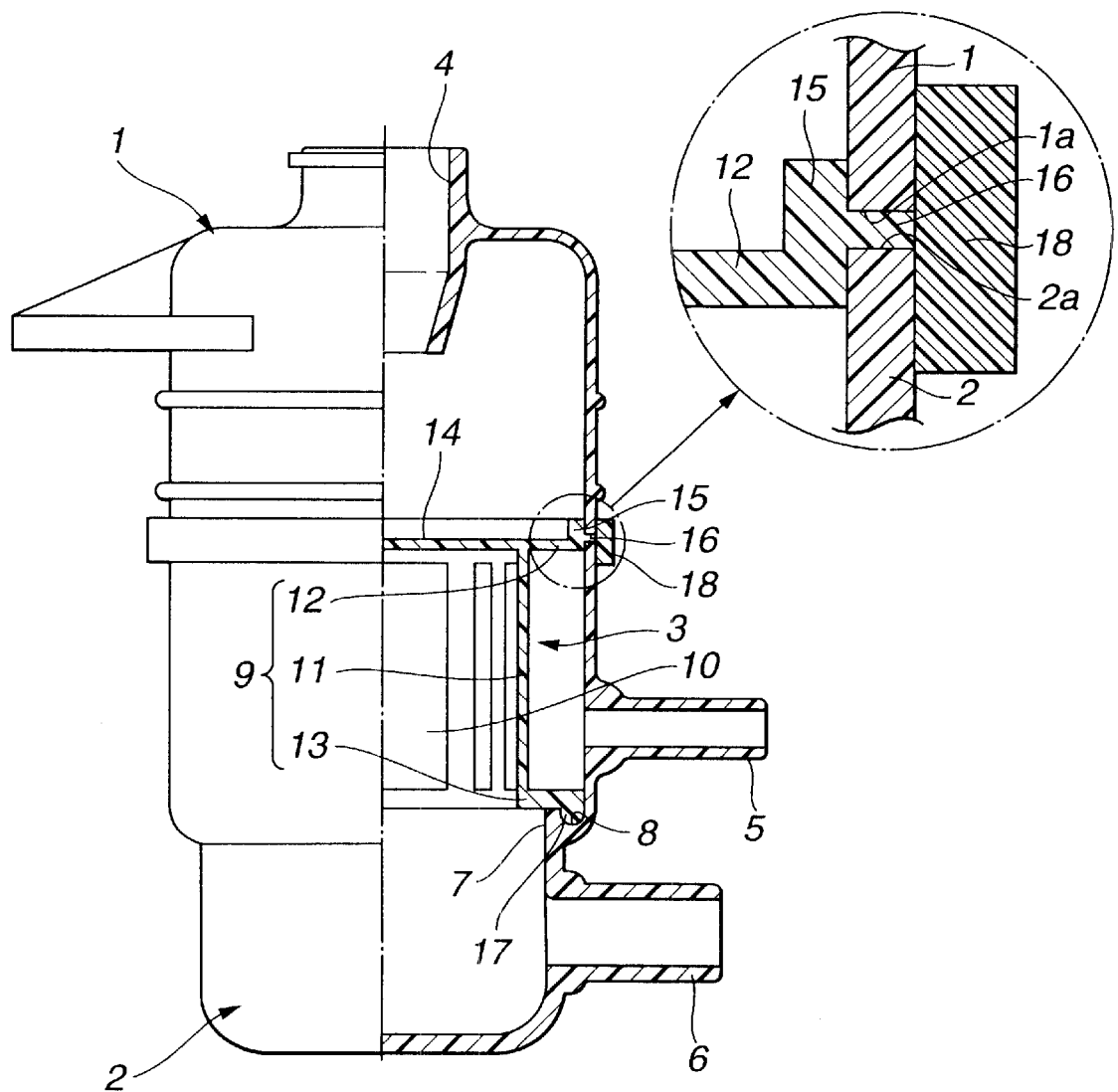
FIG. 1 is a partially cross-sectional side view showing a plastic container of an embodiment according to the present invention.
Figure 2:
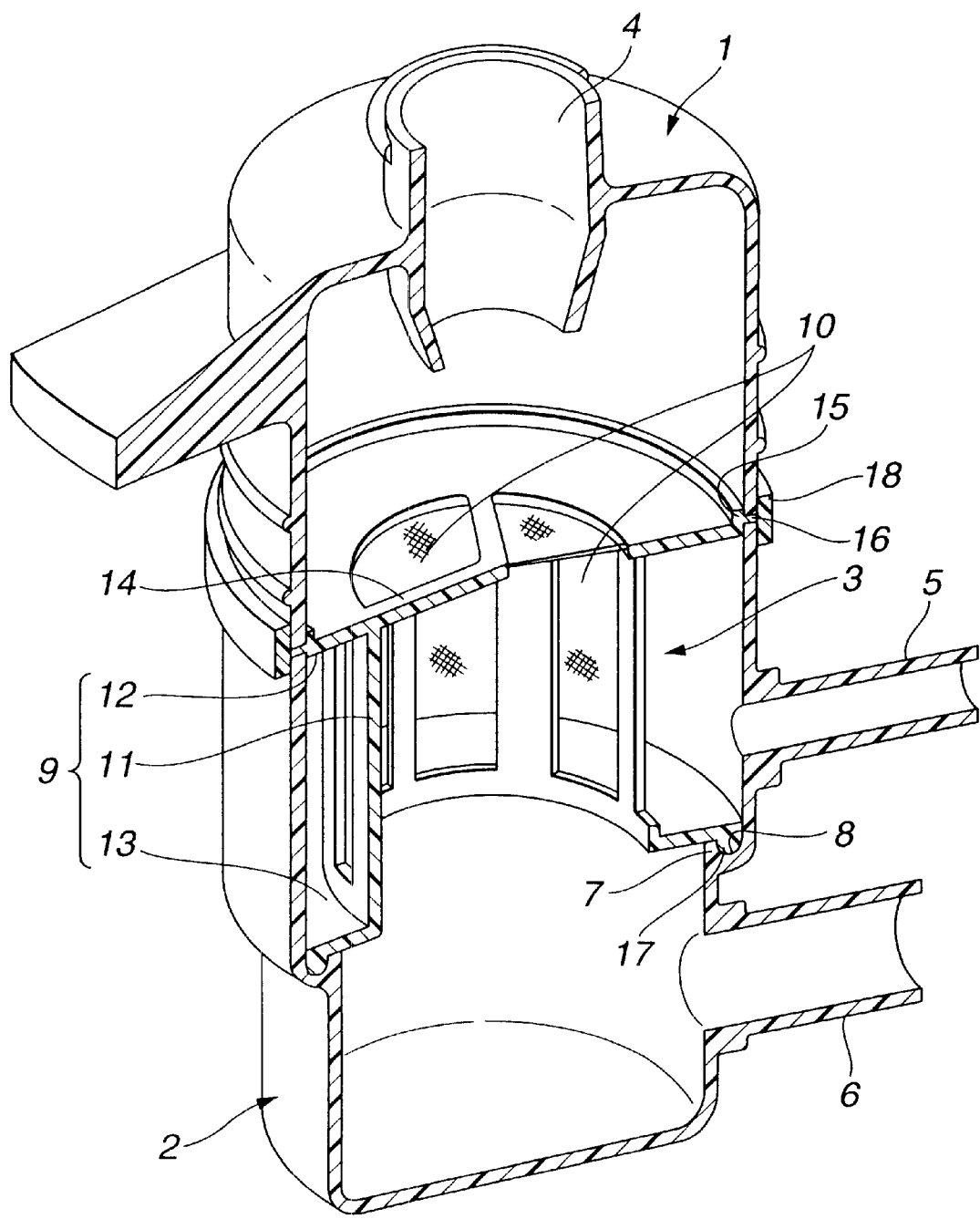
FIG. 2 is a cross-sectional perspective view showing the container.
Figure 3:
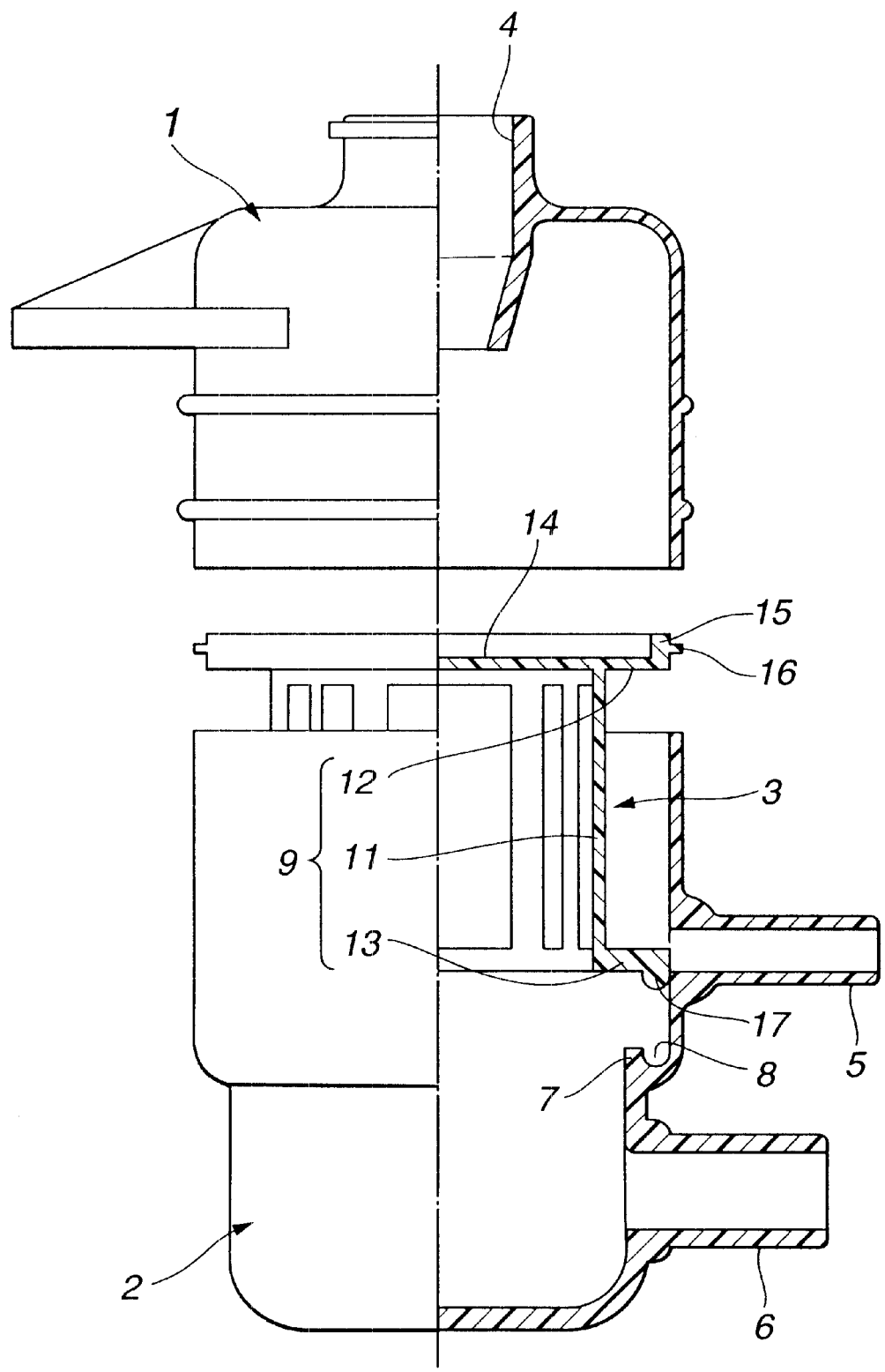
FIG. 3 is an exploded side view of FIG. 1.

The plastic container shown in FIGS. 1 to 3 is used as a vehicle oil tank, and comprises an upper tank 1 (first container member), a lower tank 2 (second container member) and a filter 3 (inner member).

As shown in FIGS. 1 to 3, each of upper and lower tanks 1 and 2 is made of plastic (resin) material and formed into a shape of a cylinder with a bottom. Opening ends of upper and lower tanks 1 and 2 are butted with each other to construct a tank main body. A cylindrical oil supply port 4 is integrally connected to an upper wall of upper tank 1. A return tube 5 for returning oil from a not-shown hydraulic circuit and an outlet tube 6 for supplying oil to the hydraulic circuit are formed on a cylinder portion of lower tank 2 in the vertical direction and extends from the outer surface of lower tank 2 along a horizontal direction in FIG. 1.

A diameter of lower tank 2 is decreased at a position between retune tube 5 and outlet tube 6 to form a small diameter portion of a stepped shape, as shown in FIGS. 1 and 2. An annular supporting wall 7 is formed at an inner periphery of lower tank 5 by the provision of the small diameter portion. An annular groove 8 is formed between annular supporting wall 7 and a large-diameter side inner surface of lower tank 2.

Filter 3 comprises a frame 9 made of plastic, a filtering mesh 10 installed to frame 9, and beams 14. Frame 9 comprises a cylinder portion 11 which has a plurality of openings, an upper flange 12 which horizontally extends from an upper end of cylinder portion 11, and a lower flange 13 which horizontally extends from an lower end of cylinder portion 11. Three beams 14 extend from an axial center radially to the inner periphery of the upper flange 12. Filtering mesh 10 is installed to rectangular openings formed on the cylindrical wall of the cylinder portion 11 and sector-shaped three openings defined by beams 14 and upper flange 12.

Upper flange 12 functions as a clamped support member. That is, a cylindrical flange portion 15 is formed at an outer peripheral portion of upper flange 12. Cylindrical flange portion 15 has an outer diameter which is the same as inner diameters of upper tank 1 and lower tank 2. Further, an annular clamped portion 16 is formed on an outer surface of cylindrical flange portion 15. Annular clamped portion 16 is located at a generally center portion of cylindrical flange portion 15 in the vertical direction and extends from the outer surface outwardly along the horizontal direction in FIG. 1. An outer diameter of annular clamped portion 16 is the same as outer diameters of upper tank 1 and lower tank 2, and annular clamped portion 16 is clamped by butt portions (connection surfaces) 1a and 2a of upper and lower tanks 1 and 2 as shown in FIGS. 1 and 2.

Lower flange 13 of filter 3 comprises an engaged annular rib 17 which is formed at an outermost portion of a lower surface of lower flange 13 as shown in FIGS. 1 and 2. Engaged annular rib 17 is engaged with annular groove 8 of lower tank 2 when filter 3 is correctly installed in lower tank 2.

Lower flange 13 and cylinder portion 11 of filter 3 are disposed in lower tank 2. An upper half part of cylindrical flange portion 15 of upper flange 12 is engaged with upper tank 1, and a lower half part of cylindrical flange portion 15 of upper flange 12 is engaged with lower tank 2. Further, annular clamped portion 16 of upper flange 12 is clamped by upper and lower butt portions 1a and 2a of upper and lower tanks 1 and 2. After filter 3 is assembled with upper and lower tanks 1 and 2, plastic band 18 is fixedly and annularly formed on an outer surface including both butt portions 1a and 2a and annular clamped portion 16 by injection welding. More specifically, melting plastic is injected on the outer periphery and is integrated with butt portions 1a and 2a and annular clamped portion 16. Then, the melting plastic is cooled and solidified so as to function as plastic band 18. Therefore, plastic band 18 sealingly and fixedly connects upper and lower tanks 1 and 2.

This oil tank according to the present invention is produced by using a molding die set and mechanism shown in FIGS. 4 to 8.

Figure 4:
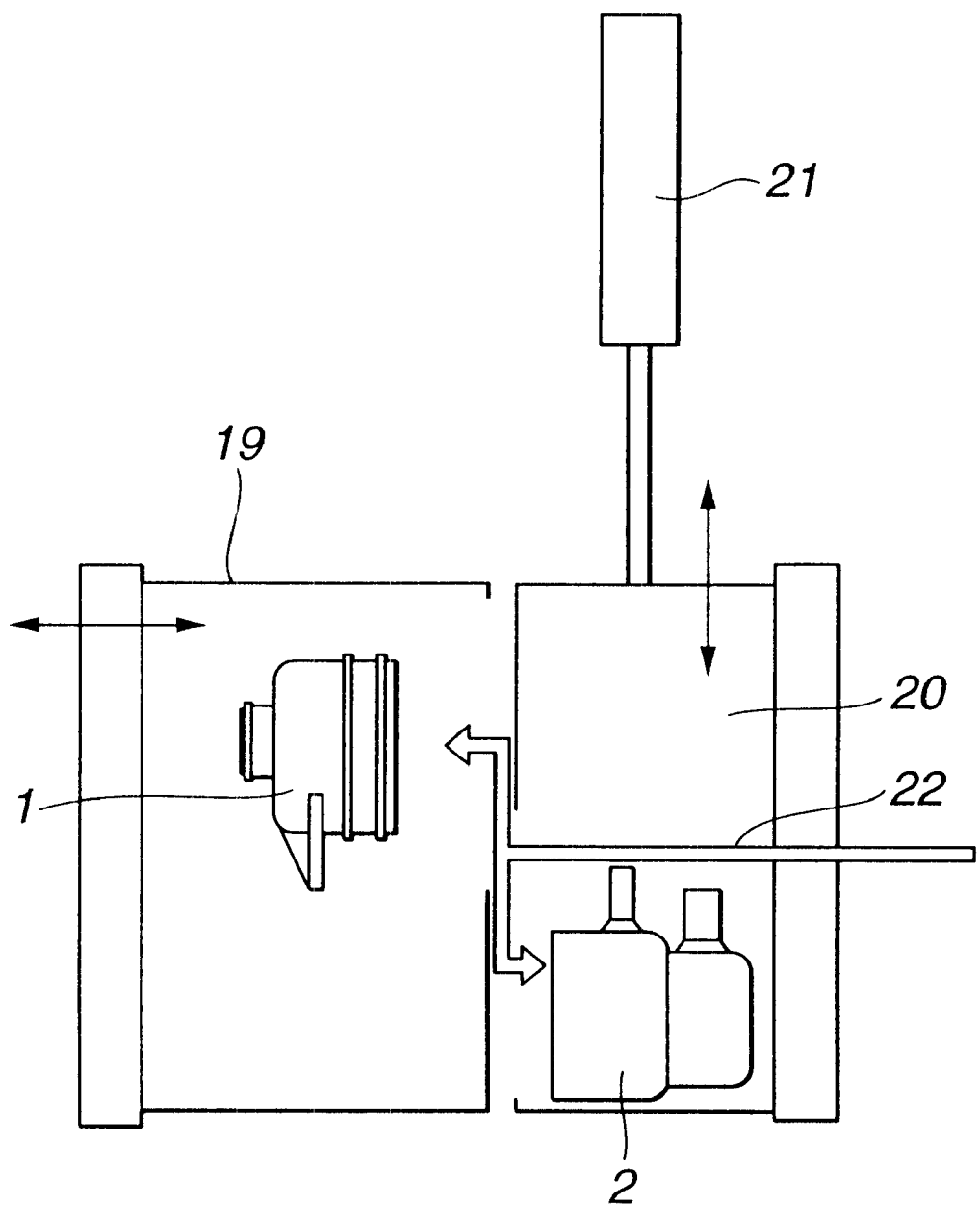
FIG. 4 is a schematic view showing a first production process of the embodiment according to the present invention.

As shown in FIGS. 4 to 8, a movable die 19 is arranged to be moved in a fore and aft direction (horizontal direction) in FIG. 4 by a not-shown cylinder. A sliding die 20 is arranged to be slid along the vertical direction in FIG. 4 by a cylinder 21.

A first cavity for molding upper tank 1 is provided in movable die 19, and a second cavity for molding lower tank 2 is provided in sliding die 20.

The first and second cavities are arranged such that when sliding die 20 is located at a lowest position, the first cavity is offset from the second cavity in the vertical direction. A runner 22 for supplying melting plastic to the first and second cavities is detachably installed to movable die 19 and sliding die 20.

Figure 5:
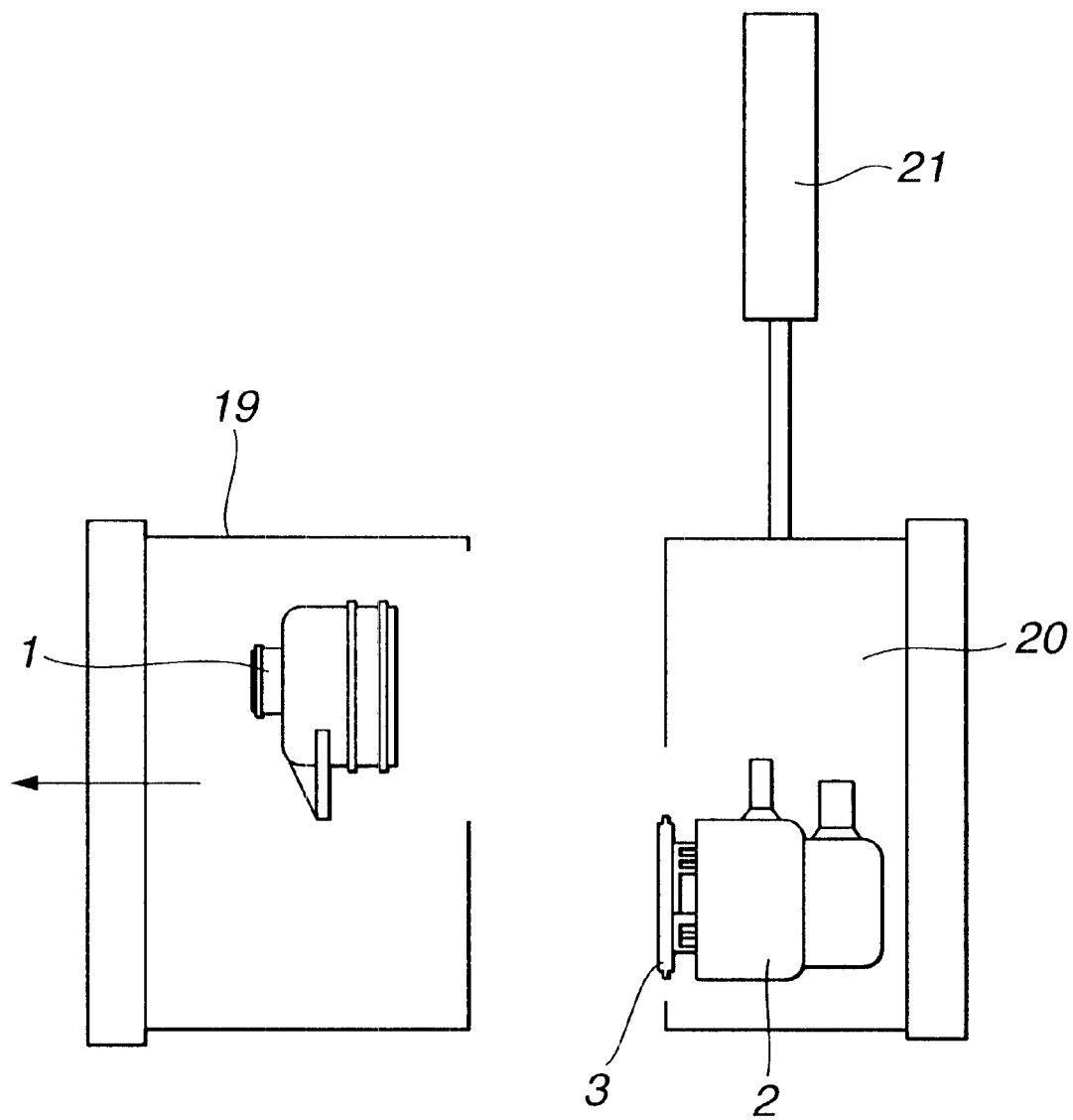
FIG. 5 is a schematic view showing a second production process of the embodiment according to the present invention.

In the process for molding upper and lower tanks 1 and 2, sliding die 20 is slid downward as shown in FIG. 4 and is fittingly in contact with movable die 19. Then, melting plastic is supplied to the first and second cavities through runner 22 to fill the first and second cavities with melting plastic. Thereafter, when the state of the fulfilled plastic in the first and second cavities is changed from the melting state to the solid state, movable die 19 is separated from sliding die 20 as shown in FIG. 5, and runner 22 is removed. Further, filter 3, which has been previously molded, is set in lower tank 2.

When filter 3 is inserted into lower tank 3 in some degree, engaged annular rib 17 of filter 3 is engaged with annular groove 8, and a lower surface of annular clamped portion 16 of filter 3 is contacted with butt portion 2a of lower tank 2, as shown in FIGS. 1 and 2. Accordingly, by inserting filter 3 into lower tank 2 until the insertion of filter 3 is stopped by annular groove 8 of lower tank 2, filter 3 is correctly set in lower tank 2.

Figure 6:
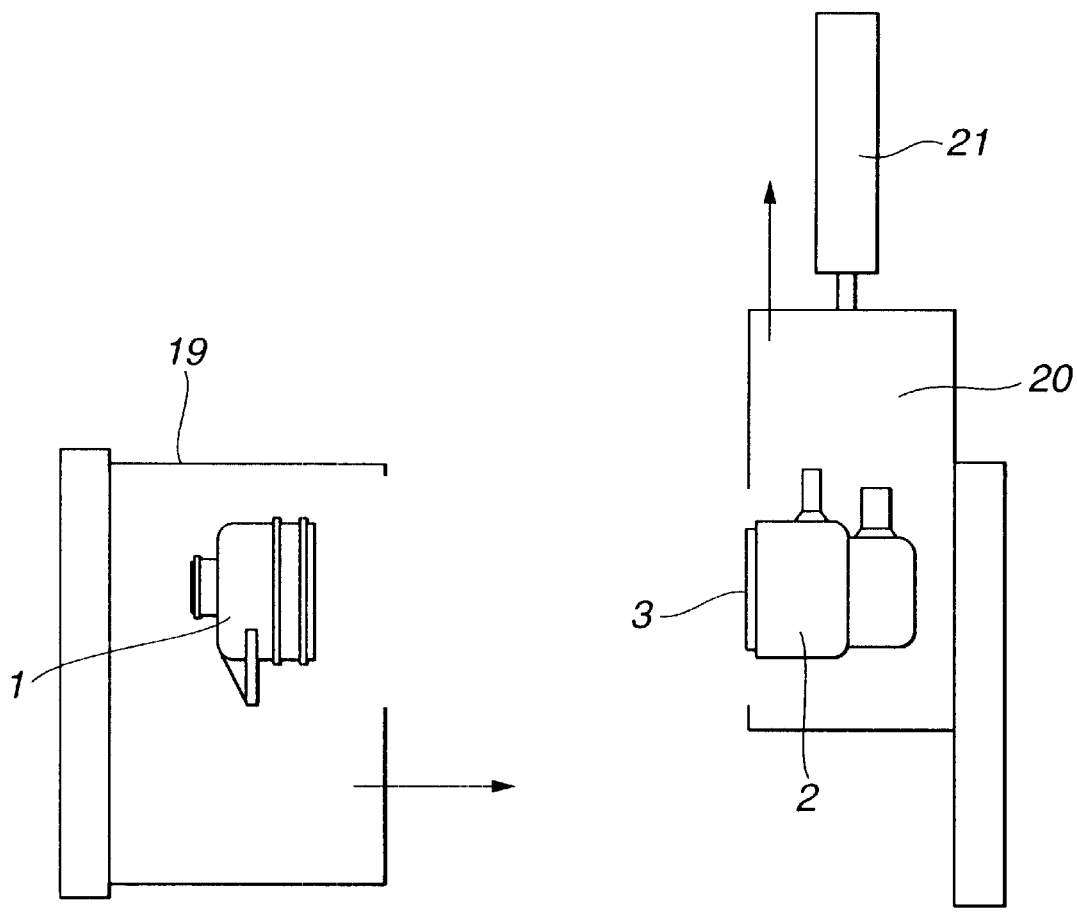
FIG. 6 is a schematic view showing a third production process of the embodiment according to the present invention.

Next, as shown in FIG. 6, sliding die 20 is upwardly slid by cylinder 21 so that the height level of lower tank 2 in sliding die 20 is adjusted with a height level of upper tank 1 in movable die 19. Then, movable die 19 is horizontally moved so that cylindrical flange portion 15 of filter 3 is engaged with the inner surfaces of upper and lower tanks 1 and 2, and annular clamped portion 16 of filter 3 is clamped by butt portions 1a and 2a of upper and lower tanks 1 and 2.

Figure 7:
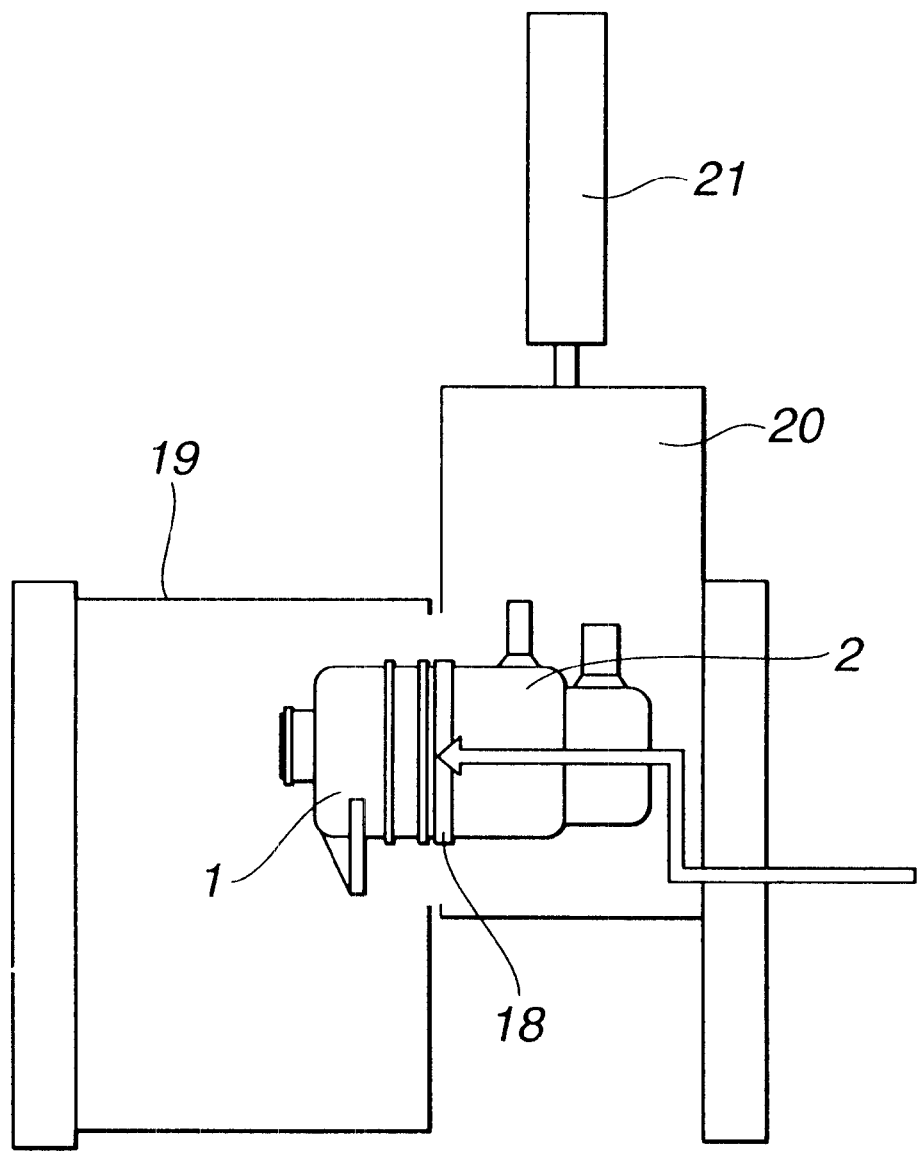
FIG. 7 is a schematic view showing a fourth production process of the embodiment according to the present invention.

This clamped state is kept, and movable die 19 and sliding die 20 are closed with each other. Then, melting plastic is injected around an outer peripheral portion including butt portions 1a and 2a to form plastic band 18 thereon as shown in FIG. 7.

Figure 8:
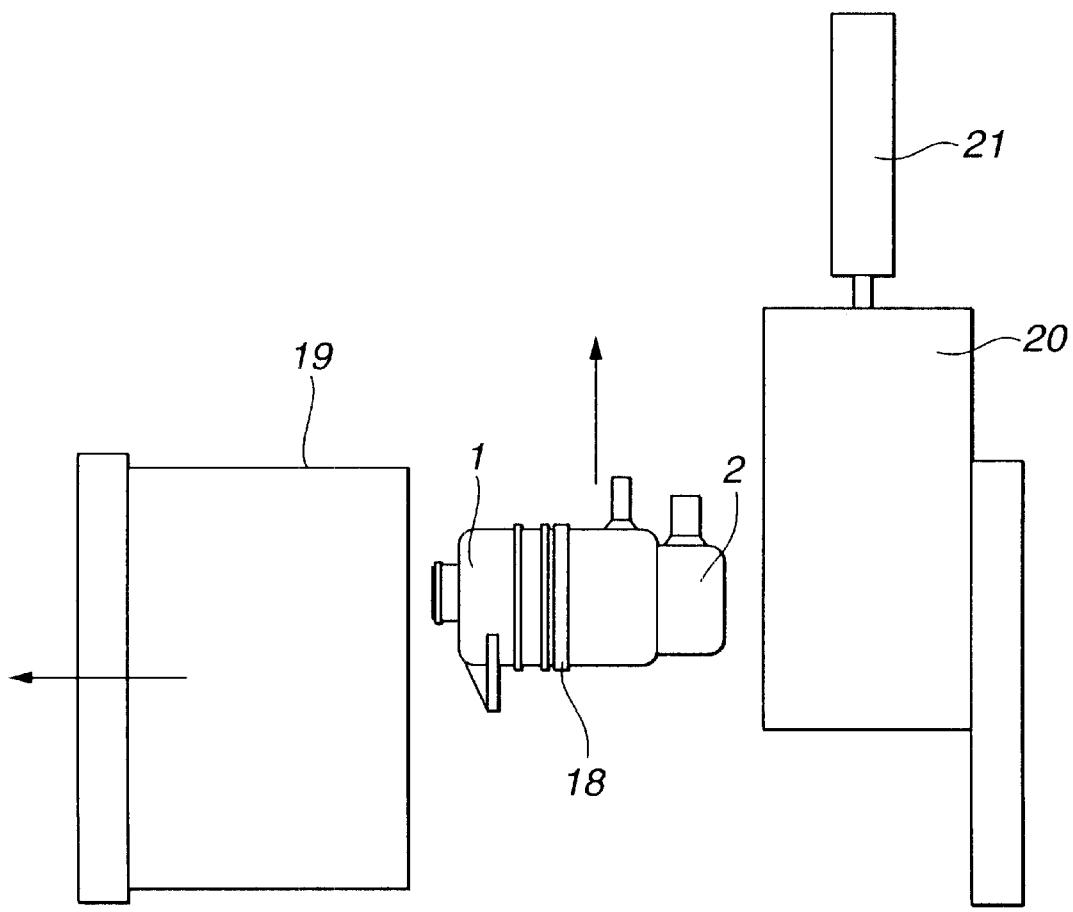
FIG. 8 is a schematic view showing a fifth production process of the embodiment according to the present invention.

After plastic band 18 is changed from melting state to solid state, the produced oil tank is taken out by moving movable die 19 as shown in FIG. 8.

Such an oil tank produced by the above mentioned manner has a structure that butt portions 1a and 2a of upper and lower tanks 1 and 2 are reinforced by upper flange 12 of filter 3. Accordingly, it becomes possible to prevent a portion near butt portions 1a and 2a from being deformed by an injection pressure during the injection welding of plastic band 18. This firmly improves the production accuracy of the plastic container.

Further, since annular clamped portion 16 of filter 3 is clamped by butt portions 1a and 2a of the upper and lower tanks 1 and 2, filter 3 is accurately disposed at a correct position, and the connecting strength by injection welding is also improved by this clamp structure.

Furthermore, since cylinder portion 11, upper and lower flanges 12 and 13 of frame 9 of filter 3 construct a strong structure of I-shaped cross section and strongly support a wide area of the inner surface of the oil tank, the rigidity of the oil tank is improved.

Since there are provided upper and lower flanges 12 and 13 at upper and lower ends of cylinder portion 11 of filter 3, an annular return passage is produced around the filtering mesh 10 so as to smoothly return the oil through return tube 5 to the oil tank while being guided by upper and lower flanges 12 and 13.

Although the embodiment according to the present invention has been shown and described so that a plastic container is adapted to a vehicle oil tank, it will be understood that the invention is not limited to this and may be adapted to other containers.

Further, although the embodiment according to the present invention has been shown and described so that cylindrical flange portion 15 of upper flange 12 is engaged with upper tank 1 and lower tank 2, the engagement state of cylindrical flange portion with upper and lower tanks 1 and 2 includes a loosely contacting state, a fittingly contacting state and a press-fitted connected state.

The entire contents of Japanese Patent Application No. 2000-246144 filed on Aug. 15, 2000 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A plastic container comprising:
   a first container member comprising a first butt portion;
   a second container member comprising a second butt portion butted with the first butt portion;
   an inner member comprising a cylindrical flange portion, the inner member being disposed in a space defined by the first and second container members, the cylindrical flange portion of the inner member being engaged with the first and second butt portions; and a band member formed on the first and second butt portions by injection welding, the band member fixedly connecting the first and second butt portions.

2. A plastic container as claimed in claim 1, wherein the inner member comprises an annular clamped portion extending from an outer periphery of the cylindrical flange portion, the annular clamped portion being clamped by the first and second butt portions.

3. A plastic container as claimed in claim 1, wherein the plastic container is used as an oil tank, and the inner member includes a filter.

4. A plastic container as claimed in claim 1, wherein the inner member comprises a cylinder portion, a first flange fixed to and radially and outwardly extending from an end of the cylinder portion, and a second flange fixed to and radially and outwardly extending from the other end of the cylinder portion, one of the first and second flanges being engaged with the first and second butt portions, and the other of the first and second flanges being engaged with a stopper formed at an inner surface of one of the first and second container members.

5. A plastic container as claimed in claim 4, wherein an engaged annular rib is formed at an outer periphery of one of the first and second flanges and is engaged with the stopper formed by steppedly decreasing a diameter of one of the first and second tank members.

* * * * *